US012354392B2

(12) United States Patent
Elagouni et al.

(10) Patent No.: US 12,354,392 B2
(45) Date of Patent: Jul. 8, 2025

(54) GESTURE STROKE RECOGNITION IN TOUCH-BASED USER INTERFACE INPUT

(71) Applicant: MyScript, Nantes (FR)

(72) Inventors: Khaoula Elagouni, Nantes (FR); Cyril Cerovic, Nantes (FR); Julien Vergne, Nantes (FR)

(73) Assignee: MyScript, Nantes (FR)

( * ) Notice: Subject to any disclaimer, the term of this patent is extended or adjusted under 35 U.S.C. 154(b) by 0 days.

(21) Appl. No.: 17/780,081

(22) PCT Filed: Nov. 26, 2020

(86) PCT No.: PCT/EP2020/083495
§ 371 (c)(1),
(2) Date: May 26, 2022

(87) PCT Pub. No.: WO2021/105279
PCT Pub. Date: Jun. 3, 2021

(65) Prior Publication Data
US 2023/0008529 A1    Jan. 12, 2023

(30) Foreign Application Priority Data
Nov. 29, 2019 (EP) .................................. 19306542

(51) Int. Cl.
*G06V 30/148* (2022.01)
*G06V 10/764* (2022.01)
(Continued)

(52) U.S. Cl.
CPC .......... *G06V 30/148* (2022.01); *G06V 10/764* (2022.01); *G06V 30/1834* (2022.01); *G06V 30/30* (2022.01)

(58) Field of Classification Search
CPC ............... G06V 30/148; G06V 10/764; G06V 30/1834; G06V 30/30; G06V 30/1423;
(Continued)

(56) References Cited

U.S. PATENT DOCUMENTS

| 9,875,254 B2 | 1/2018 | Lallican |
| 2004/0054701 A1 | 3/2004 | Garst |
| 2006/0210163 A1* | 9/2006 | Garside et al. ............... 382/186 |

FOREIGN PATENT DOCUMENTS

| EP | 1141941 A2 | 10/2001 |
| WO | 2017/008896 A1 | 1/2017 |

(Continued)

OTHER PUBLICATIONS

Xiaojie Wu, Achieving Interoperability of Pen Computing with Heterogeneous Devices and Digital Ink Formats, Dec. 2004, In Computer Science, Submitted in Partial Fulfillment of the Requirements for the Degree of Master of Science, the University of Western Ontario London, Ontario (Year: 2004).*

(Continued)

*Primary Examiner* — Chineyere Wills-Burns
*Assistant Examiner* — Phuong Hau Cai
(74) *Attorney, Agent, or Firm* — McDermott Will & Emery LLP

(57) ABSTRACT

A method for recognizing gesture strokes in user input, comprising: receiving data generated based on the user input, the data representing a stroke and comprising a plurality of ink points in a rectangular coordinate space and a plurality of timestamps associated respectively with the plurality of ink points; segmenting the plurality of ink points into a plurality of segments each corresponding to a respective sub-stroke of the stroke and comprising a respective subset of the plurality of ink points; generating a plurality of feature vectors based respectively on the plurality of seg- (Continued)

ments; and applying the plurality of feature vectors as an input sequence representing the stroke to a trained stroke classifier to generate a vector of probabilities including a probability that the stroke is a non-gesture stroke and a probability that the stroke is a given gesture stroke of a set of gesture strokes.

14 Claims, 8 Drawing Sheets

(51) Int. Cl.
  *G06V 30/182* (2022.01)
  *G06V 30/30* (2022.01)
(58) Field of Classification Search
  CPC .... G06V 30/347; G06V 30/36; G06F 40/171; G06F 3/04883
  See application file for complete search history.

(56) References Cited

FOREIGN PATENT DOCUMENTS

WO 2017/067652 A1 4/2017
WO 2017/067653 A1 4/2017

OTHER PUBLICATIONS

"Dean Rubine et. al., Specifying Gestures by Example, Jul. 1991, Computer Graphics, vol. 25, No. 4" (Year: 1991).*
"Victor Carbune et. al., Fast Multi-language LSTM-based Online Handwriting Recognition, Feb. 2019, Computational and Language, Machine Learning" (Year: 2019).*
"Don Willems et al., Iconic and Multi-Stroke Gesture Recognition, Jan. 2009, Pattern Recognition 42 3303-3312, ScienceDirect" (Year: 2009).*
"Darya Frolova et. al., Most Probable Longest Common Subsequence for Recognition of Gesture Character Input, Jun. 2013, IEEE Transactions on Cybernetics, vol. 43, No. 3" (Year: 2013).*
"Yefeng Zheng et. al., Machine Printed Text and Handwriting Identification in Noisy Document Images, Mar. 2004, IEEE Transactions on Pattern Analysis and Machine Intelligence, vol. 26, Issue 3" (Year: 2004).*
"R. Reeve Ingle et. al., A Scalable Handwritten Text Recognition System, Sep. 2019, 2019 International Conference on Document Analysis and Recognition, Sydney, Australia" (Year: 2019).*
RO/EP: International Search Report mailed on Feb. 5, 2021 for corresponding International Application No. PCT/EP2020/083495; 3 pgs.
RO/EP: Written Opinion mailed on Feb. 5, 2021 for corresponding International Application No. PCT/EP2020/083495; 6 pgs.
Bishop, C.M., "Neural Networks for Pattern Recognition," Oxford Univ. Press, 1st Ed. (1996) ASIN: 0198538642; 502 pgs.
Gers, F., et al., "Learning precise timing with LSTM recurrent networks," (2002) Journal of Machine Learning Research, 3 pp. 115-143, Switzerland.
Graves, A., et al., "Framewise phoneme classification with bidirectional LSTM and other neural network architectures," (2005), Neural networks, 18(5-6), pp. 602-610, Switzerland.
Hochreiter, S., et al., "Long Short-Term Memory," (1997) NC, 9(8 pp. 1735-1780, Germany.
EPO: Extended European Search Report for related European Application No. 19306542.2 mailed May 29, 2022; 5 pgs.

* cited by examiner (a) Strike through  (b) Underline

TECNICA CALCISTICA

L'insieme dei movimenti che il calciatore compie con la palla o in funzione di questa durante la gara.

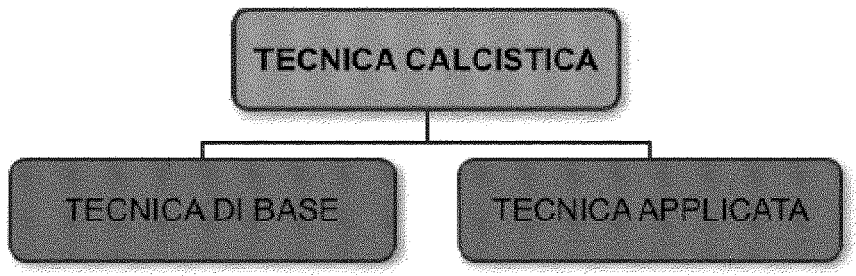

La qualità del gioco dipende in massima parte dalle qualità ed abilità tecniche dei calciatori.
**La tecnica sopravvive senza la tattica,
la tattica senza la tecnica no.**

FIG.9A

TECNICA CALCISTICA

L'insieme dei movimenti che il calciatore compie con la palla o in funzione di questa durante la gara.

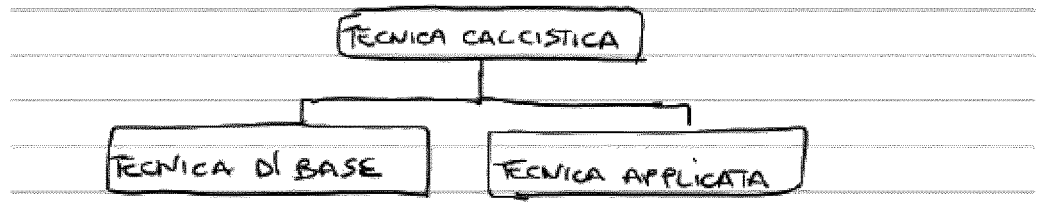

La qualità del gioco dipende in massima parte dalle qualità ed abilità tecniche dei calciatori.
La tecnica sopravvive senza la tattica,
la tattica senza la tecnica no.

FIG.9B

Identité remarquable
$(A^2 + AD - B^2) \cdot (A - B) = A^1 - B^3$
le trinôme conjugué de $(A-B)$ et
$(A^2 + AD + B^2)$ Multiploan "haut et bas" par le
trinôme conjuguè de numéateur

GESTURE STROKE RECOGNITION IN TOUCH-BASED USER INTERFACE INPUT

CROSS-REFERENCE TO RELATED APPLICATIONS

This application is a U.S. National Phase under 35 U.S.C. § 371 of International Application No. PCT/EP2020/083495, filed on Nov. 26, 2020; which claims the benefit of priority to European Application No. 19306542.2, filed Nov. 29, 2019; both of which are incorporated herein by reference in their entirety for all purposes.

FIELD OF THE INVENTION

The present invention relates to the field of gesture recognition in touch-based user interfaces.

BACKGROUND

In the context of electronic document creation or editing via a touch-based user interface, there is a need to distinguish between gesture strokes, i.e., strokes which are associated with realizing a defined action on the content, and non-gesture strokes, such as actual content (e.g., text, math, shape, etc.) being added by the user.

Existing gesture recognition techniques are rules-based. More specifically, they rely on a manual definition of a set of heuristics for recognizing a defined set of gestures. While the performance of these techniques is generally acceptable, they typically perform poorly for more elaborate/atypical gesture strokes. In addition, the update of these techniques to add new gesture strokes is difficult because of the need to develop new heuristics each time for the new gesture strokes.

SUMMARY OF THE INVENTION

The present invention addresses some of the recognized deficiencies of the prior art. Specifically, the present invention proposes a method for recognizing gesture strokes in user input applied onto an electronic document via a touch-based user interface, comprising:
- receiving data generated based on the user input, the data representing a stroke and comprising a plurality of ink points in a rectangular coordinate space and a plurality of timestamps associated respectively with the plurality of ink points;
- segmenting the plurality of ink points into a plurality of segments each corresponding to a respective sub-stroke of the stroke and comprising a respective subset of the plurality of ink points;
- generating a plurality of feature vectors based respectively on the plurality of segments; and
- applying the plurality of feature vectors as an input sequence representing the stroke to a trained stroke classifier to generate a vector of probabilities including a probability that the stroke is a non-gesture stroke and a probability that the stroke is a given gesture stroke of a set of gesture strokes.

The stroke classifier may be implemented as a neural network. The use of a neural network means that a new gesture stroke can be added easily with simple retraining of the stroke classifier on data including the new gesture stroke.

According to embodiments, the electronic document may include handwritten content and/or typeset content.

The sub-stroke segmentation allows for a sequential representation that follows the path of the stroke to be obtained. Each segment corresponds as such to a local description of the stroke. Compared to representing the stroke as a mere sequence of points, sub-stroke segmentation permits to maintain path information (i.e., the relationships between points within each segment) which results in a reduction in computation time.

In an embodiment, the stroke classifier is implemented as a recurrent Bidirectional Long Short-Term Memory (BLSTM). The use of a recurrent BLSTM neural network means that the network includes memory blocks which enable it to learn long-term dependencies and to remember information over time. This type of network permits the stroke classifier to handle a sequence of vectors (an entire stroke) and to account for the temporal dependencies between successive sub-strokes (i.e., to remember the details of the path of the stroke).

In an embodiment, the method further comprises generating a plurality of corrected timestamps based on the plurality of timestamps.

The correction of the plurality of timestamps is advantageous to remove artifacts related to device capture and to improve gesture stroke recognition. Indeed, due to device capture issues, it is common that certain timestamps do not correspond to the exact instants at which their respective ink points are drawn. For example, in certain devices, the timestamps assigned to ink points correspond to the time at which an event log containing the ink points is sent to a processor unit, not the precise instants at which the ink points are captured. As such, different successive ink points can have the same timestamp value in the received data. Correction of the plurality of timestamps ensures that the timestamps better reflect the exact instants at which the respective ink points are drawn by the user. Improved gesture recognition is thereby achieved.

In an embodiment, generating the plurality of corrected timestamps based on the plurality of timestamps comprises:
- determining a function that approximates an original timestamp curve of the plurality of ink points; and
- modifying a timestamp of the plurality of timestamps to a value obtained according to the determined function.

In an embodiment, the method further comprises resampling the plurality of ink points to generate a second plurality of ink points and an associated second plurality of timestamps, Resampling the plurality of ink points is advantageous to ensure uniform performance across different devices. Indeed, as devices typically use different sampling techniques, the data received may differ in terms of sampling characteristics between devices.

In an embodiment, the second plurality of timestamps are characterized by a fixed duration between consecutive timestamps.

In an embodiment, the resampling comprises interpolating the plurality of ink points and associated plurality of timestamps to generate the second plurality of ink points and the associated second plurality of timestamps.

In an embodiment, the segmenting of the plurality of ink points comprises segmenting the plurality of ink points such that the plurality of segments have equal duration. Alternatively or additionally, the plurality of segments may have an equal number of ink points. Improved recognition accuracy was shown to result from using one or more of these segmentation techniques.

In an embodiment, generating the plurality of feature vectors based respectively on the plurality of segments comprises, for each segment of the plurality of segments corresponding to a respective sub-stroke:

generating geometric features that represent the shape of the respective sub-stroke; and generating neighborhood features that represent spatial relationships between the sub-stroke and content that neighbors the sub-stroke.

The content that neighbors the sub-stroke may be defined as content that intersects a window centered with respect to the sub-stroke.

According to this embodiment, the feature vector associated with a sub-stroke describes both the shape of the sub-stroke and the content in which the sub-stroke is drawn. These two types of information are complementary and allow for a highly accurate recognition of the stroke as a gesture stroke or a non-gesture stroke.

In an embodiment, generating the geometric features comprises generating statistical sub-stroke geometric features and/or global sub-stroke geometric features for the sub-stroke. The statistical sub-stroke geometric features are features derived from statistical analysis performed on individual ink point geometric features. The global sub-stroke geometric features are features that represent the overall sub-stroke path (e.g., length, curvature, etc.).

In an embodiment, generating the statistical sub-stroke geometric features comprises, for each geometric feature of a set of geometric features:

determining respective values for the ink points of the segment corresponding to the respective sub-stroke; and calculating one or more statistical measures based on the determined respective values.

In an embodiment, generating the global sub-stroke geometric features for the sub-stroke comprises computing one or more of: a sub-stroke length, a count of singular ink points within the sub-stroke, and a ratio between the sub-stroke length and a distance between a first and a last ink point of the sub-stroke.

In an embodiment, generating the neighborhood features comprises generating one or more of:

textual neighborhood features representing spatial relationships between the sub-stroke and textual content that neighbors the sub-stroke;

mathematical neighborhood features representing spatial relationships between the sub-stroke and mathematical content that neighbors the sub-stroke; and non-textual neighborhood features representing spatial relationships between the sub-stroke and non-textual content that neighbors the sub-stroke.

In another aspect, the present invention provides a computing device, comprising:

a processor; and memory storing instructions that, when executed by the processor, configure the processor to perform a method according to any of the method embodiments described above.

In an embodiment, any of the above-described method embodiments may be implemented as instructions of a computer program. As such, the present disclosure provides a computer program including instructions that when executed by a processor cause the processor to execute a method according to any of the above-described method embodiments.

The computer program can use any programming language and may take the form of a source code, an object code, or a code intermediate between a source code and an object code, such as a partially compiled code, or any other desirable form.

The computer program may be recorded on a computer-readable medium. As such, the present disclosure is also directed to a computer-readable medium having recorded thereon a computer program as described above. The computer-readable medium can be any entity or device capable of storing the computer program.

BRIEF DESCRIPTION OF THE DRAWINGS

Further features and advantages of the present invention will become apparent from the following description of certain embodiments thereof, given by way of illustration only, not limitation, with reference to the accompanying drawings in which:

FIGS. 9A-9D illustrate an example approach for generating training data according to an embodiment of the present invention;

DETAILED DESCRIPTION OF EXAMPLE EMBODIMENTS

Systems and methods for recognizing gesture strokes in user input applied onto an electronic document via a touch-based user interface are disclosed herein.

Figure 1:
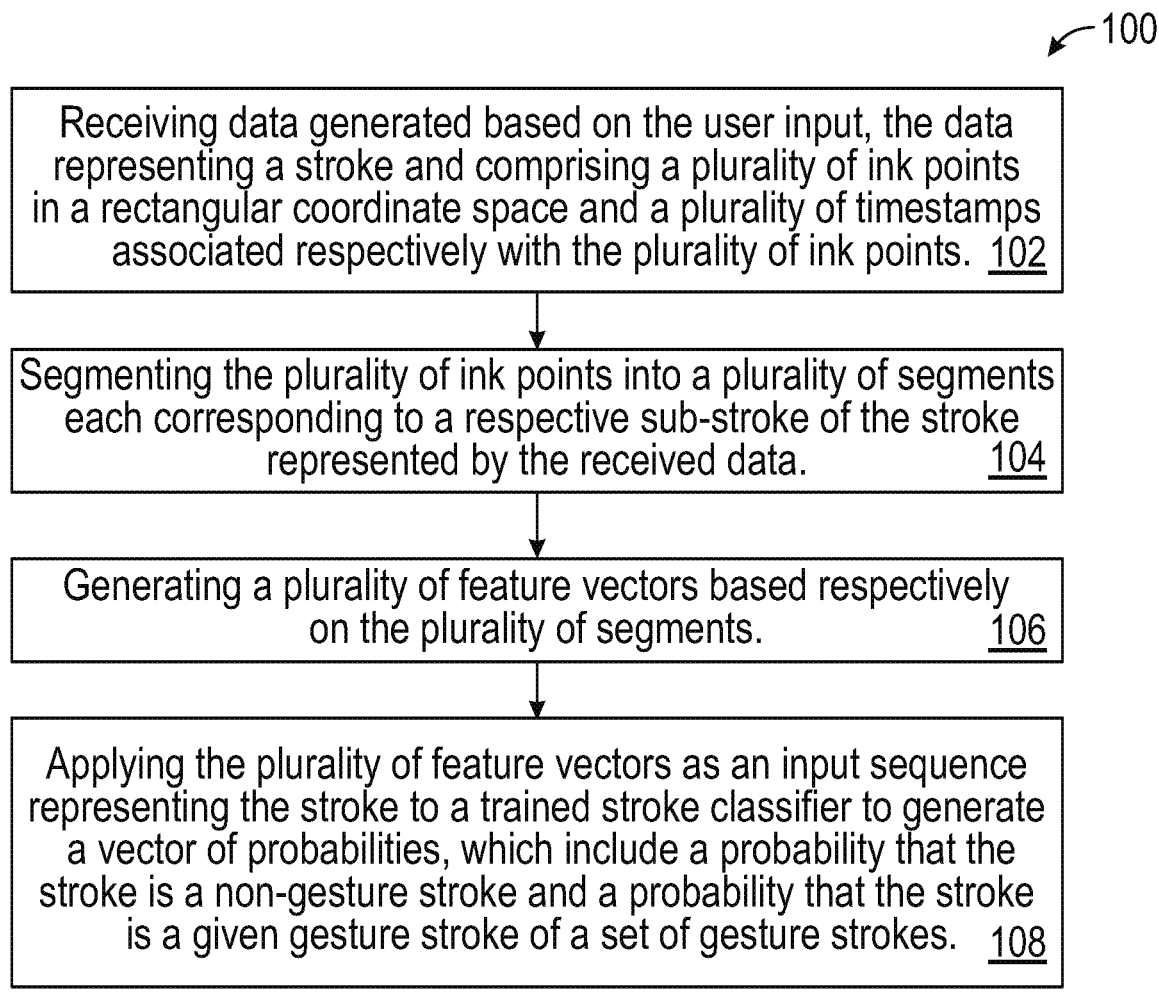
FIG. 1 illustrates an example process for recognizing gesture strokes in user input applied onto an electronic document via a touch-based user interface according to an embodiment of the present invention.

FIG. 1 illustrates an example process 100 for recognizing gesture strokes in user input applied onto an electronic document via a touch-based user interface according to an embodiment of the present invention.

Figure 2:
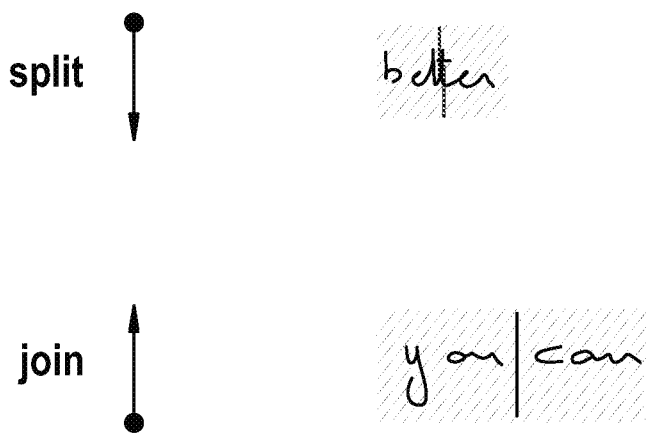
FIG. 2 illustrates example gesture strokes according to an embodiment of the present invention.

According to embodiments, a gesture stroke is a stroke having particular characteristics or attributes and which is intended to realize a corresponding action on content. In an embodiment, six gesture strokes are defined and used. These correspond to the following actions: Scratch-out (an erase gesture having a zigzag or a scribble shape), Strike-through (an erase gesture performed with a line stroke; the line stroke can be horizontal, vertical, or slanted), Split (a gesture to split a single word into two words, or a single line into two lines, or a single paragraph into two paragraphs), Join (a gesture to join two words into a single word, or two lines into a single line, or two paragraphs into a single paragraph), Surround (a gesture to surround content), and Underline. For the purpose of illustration, FIG. 2 illustrates a Split gesture stroke and a Join gesture stroke according to an example embodiment. As would be understood by a person of skill in the art based on the teachings herein, embodiments are not limited to having six gesture strokes and more or fewer gesture strokes may be defined and used.

In contrast, an add-stroke (non-gesture stroke) is any stroke that is not one of the defined gesture strokes. A non-gesture stroke may correspond to content being added by the user.

According to embodiments, gesture strokes are recognized in user input applied onto an electronic document via a touch-based user interface. Without limitation, the user input may be applied by a fingertip or a stylus pen, for example, onto the touch-based user interface. The electronic document may include handwritten content and/or typeset content. The touch-based user interface may be of any type (e.g., resistive, capacitive, etc.) and may be an interface to a computer, a mobile device, a tablet, a game console, etc.

As shown in FIG. 1, example process 100 includes steps 102, 104, 106, and 108. However, as further described below, in other embodiments, process 100 may include additional intervening or subsequent steps to steps 102, 104, 106, and 108.

In an embodiment, process 100 begins in step 102, which includes receiving data generated based on the user input applied onto the electronic document via the touch-based user interface.

The received data represents a stroke applied by the user and comprises a plurality of ink points and a plurality of timestamps associated respectively with the plurality of ink points. The plurality of ink points are localized in a rectangular coordinate space (defined based on a screen of the touch-based user interface) with each ink point being associated with (X,Y) coordinates in the rectangular coordinate space.

In an embodiment, the received data corresponds to data generated by the touch-based user interface and associated circuitry in response to capture of the stroke applied by the user. Different touch-based user interfaces may capture the stroke differently, including using different input sampling techniques, different data representation techniques, etc. In an embodiment, where the data received from the touch-based user interface is of a different format than the ink point format used by the present invention, the received data is converted such as to generate a plurality of ink points and a respective plurality of timestamps therefrom.

In an embodiment, process 100 may further include correcting the plurality of timestamps contained in the received data to generate a plurality of corrected timestamps. The plurality of corrected timestamps are then associated with the plurality of ink points and used instead of the original timestamps for the remainder of process 100.

In an embodiment, correction of the plurality of timestamps is advantageous to remove artifacts related to device capture and to improve gesture stroke recognition. Indeed, due to device capture issues, it is common that certain timestamps do not correspond to the exact instants at which their respective ink points are drawn. For example, in certain devices, the timestamps assigned to ink points correspond to the time at which an event log containing the ink points is sent to a processor unit, not the precise instants at which the ink points are captured. As such, different successive ink points can have the same timestamp value in the received data. Correction of the plurality of timestamps ensures that the timestamps better reflect the exact instants at which the respective ink points are drawn by the user. Improved gesture recognition is thereby achieved.

In an embodiment, the correction of the plurality of timestamps is done by using a function that approximates an original timestamp curve of the plurality of ink points. The approximating function may be a linear function, though embodiments are not limited as such.

Figure 3:
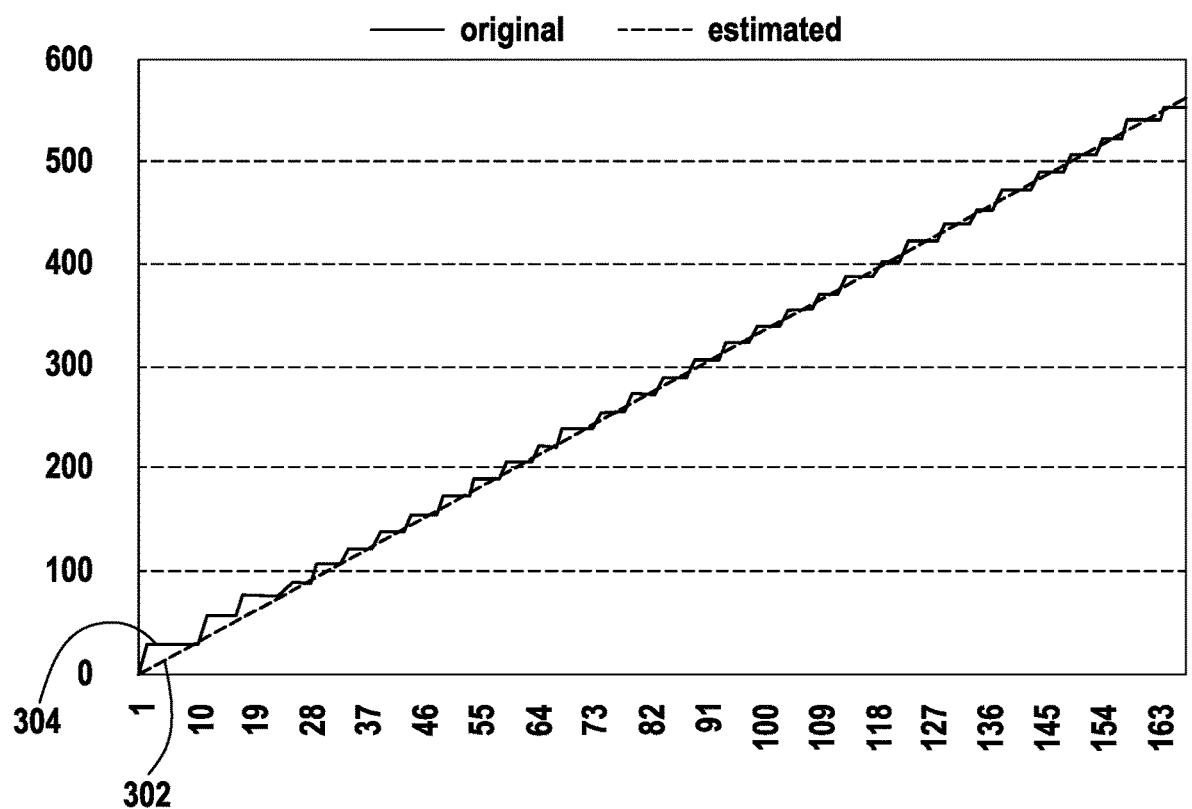
FIG. 3 illustrates an original timestamp curve and an approximating function according to an embodiment of the present invention.

FIG. 3 illustrates a linear function 302 which approximates an original timestamp curve 304 according to an example. The original timestamp curve 304 provides for each of a plurality of ink points (numbered 1 to 163 as given by the X-axis) a corresponding timestamp (between 0 and 600 as given by the Y-axis). As shown, the original timestamp curve 304 is a step function, reflecting that multiple successive ink points have the same timestamp value. As discussed before, this may be due to device capture issues.

The linear function 302 is a linear approximation of the original timestamp curve 304. In an embodiment, the linear function 302 is the best-fitting function to the original timestamp curve 304. For example, the linear function 302 is obtained by Least Squares fitting to the original timestamp curve 304.

The correction of a timestamp associated with an ink point includes modifying the timestamp associated with the ink point as provided by the original timestamp curve 304 to a corresponding value obtained by projecting the ink point onto the linear function 302.

In an embodiment, process 100 may further include resampling the plurality of ink points to generate a second plurality of ink points and an associated second plurality of timestamps. The resampling may be performed based on the original or the corrected timestamps. The second plurality of ink points and the second plurality of timestamps are then used for the remainder of process 100.

Resampling the plurality of ink points is advantageous to ensure uniform performance across different devices. Indeed, as devices typically use different sampling techniques, the data received in step 102 may differ in terms of sampling characteristics between devices.

Different resampling techniques may be used: temporal, spatial, or both. In an embodiment, resampling according to a temporal frequency is used, resulting in the second plurality of timestamps being characterized by a fixed duration between consecutive timestamps.

In an embodiment, the resampling comprises interpolating the plurality of ink points and associated plurality of timestamps to generate the second plurality of ink points and the associated second plurality of timestamps.

Returning to FIG. 1, in step 104, process 100 includes segmenting the plurality of ink points into a plurality of segments each corresponding to a respective sub-stroke of the stroke represented by the received data. Each sub-stroke comprises a respective subset of the plurality of ink points representing the stroke.

The insight behind sub-stroke segmentation is to obtain a sequential representation that follows the path of the stroke. Each segment corresponds as such to a local description of the stroke. Compared to representing the stroke as a mere sequence of points, sub-stroke segmentation permits to maintain path information (i.e., the relationships between points within each segment) which results in a reduction in computation time.

Different sub-stroke segmentation techniques may be used according to embodiments. In an embodiment, sub-stroke segmentation based on temporal information is used, resulting in the plurality of segments having equal duration. In an embodiment, the same segment duration is used for all strokes. Further, the segment duration may be device independent.

Figure 4:
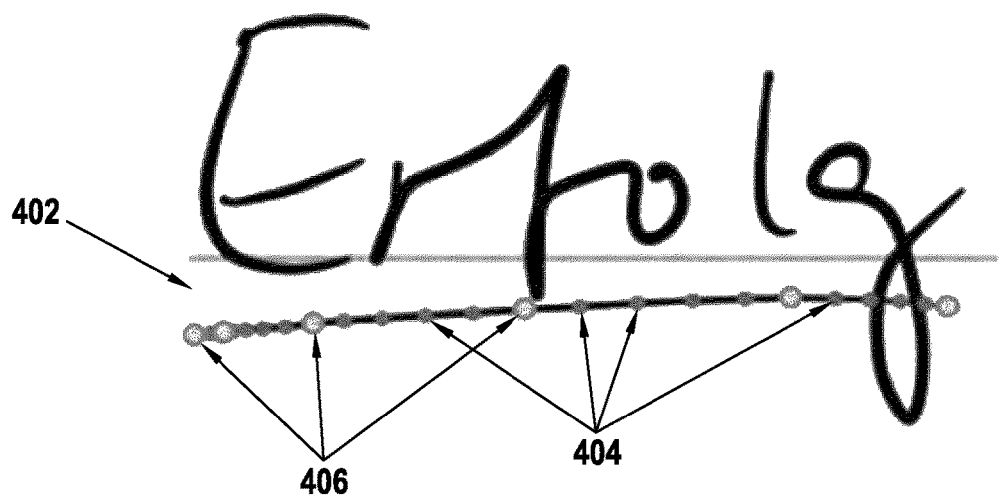
FIG. 4 illustrates an example Underline gesture stroke split into sub-stroke segments according to an embodiment of the present invention.

In an embodiment, where the plurality of ink points are resampled according to a temporal frequency, the subsequent segmentation of the plurality of ink points based on temporal information (i.e., into equal duration segments) corresponds to splitting the stroke into a plurality of segments having an equal number of ink points (with same durations but potentially with different lengths). FIG. 4 illustrates an example stroke 402 corresponding to an Underline gesture stroke. The data corresponding to stroke 402 is resampled according to a temporal frequency resulting in ink points 404 with a fixed duration between consecutive timestamps. The resampled ink points 404 are then split into sub-strokes of equal segment duration, defined by ink points 406. As such, the stroke 402 is split into segments having an equal number of ink points as shown in FIG. 4.

Returning to FIG. 1, in step 106, process 100 includes generating a plurality of feature vectors based respectively on the plurality of segments.

In an embodiment, step 106 includes, for each segment of the plurality of segments which corresponds to a respective sub-stroke of the stroke: generating geometric features that represent the shape of the respective sub-stroke; and generating neighborhood features that represent spatial relationships between the sub-stroke and content that neighbors the sub-stroke.

In an embodiment, the content that neighbors the sub-stroke is content that intersects a window centered with respect to the sub-stroke. The window size may be configured in various ways. In one embodiment, the window size is set proportionally to the mean height of characters and/or symbols in the electronic document. In another embodiment, if the electronic document contains no characters or symbols, the window size is set proportionally to the size of the touch-based user interface (which may correspond to the screen size of the device).

In an embodiment, generating the geometric features associated with a segment or sub-stroke includes generating statistical sub-stroke geometric features and/or global sub-stroke geometric features.

In an embodiment, the statistical sub-stroke geometric features are features derived from statistical analysis performed on individual ink point geometric features.

In an embodiment, a set of individual geometric features of interest to be computed per ink point of the segment is defined. The set of individual geometric features may describe for example geometric relationships between the (current) ink point and the previous ink point in the segment, the next ink point in the segment, the first ink point in the stroke, and/or a center of gravity of the stroke (obtained by averaging the X and Y coordinates of the ink points of the stroke).

Figure 5A:
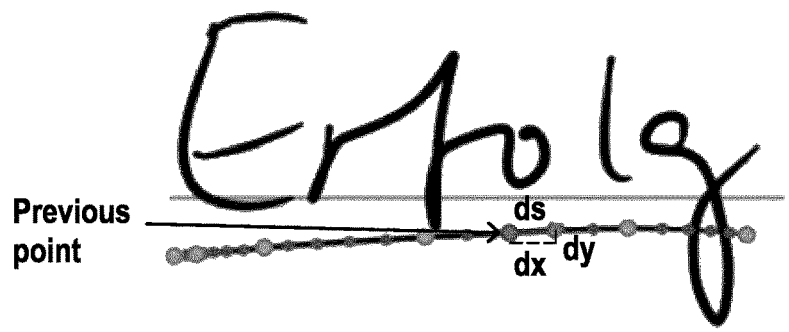
FIGS. 5A-D illustrate example statistical sub-stroke geometric features according to an embodiment of the present invention.
Figure 5B:
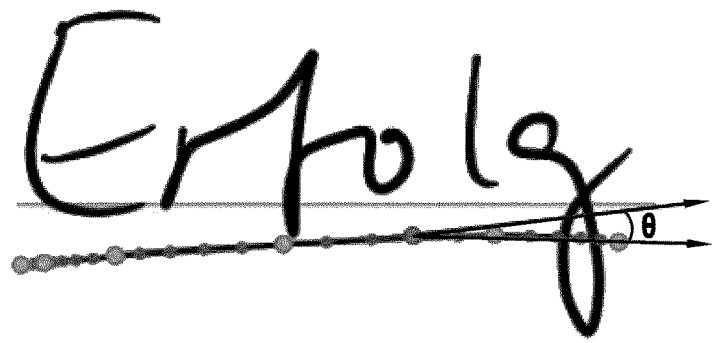
Figure 5C:
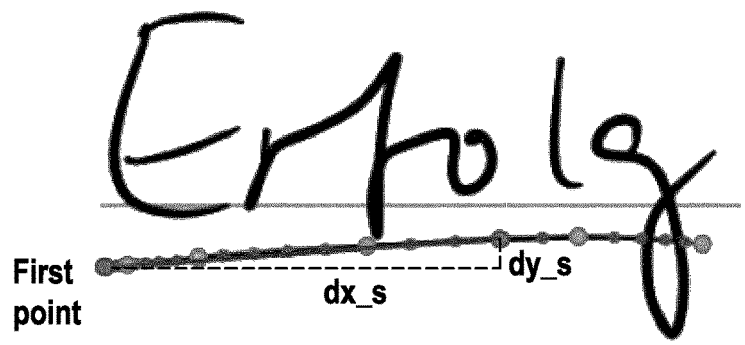
Figure 5D:
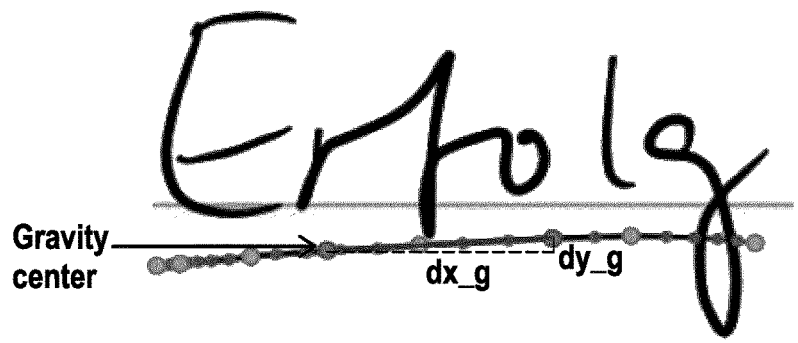

In an embodiment, the set of individual geometric features may include: the absolute distance "ds" between the current ink point and the previous ink point in the segment (shown in FIG. 5A); the projections "dx" and "dy" on the X and Y axes respectively of the distance "ds" (shown in FIG. 5A); a measure of the curvature at the current ink point, represented in an embodiment illustrated in FIG. 5B, by the values cos θ, sin θ, and θ, where θ is the angle formed between the line connecting the previous ink point to the current ink point and the line connecting the current ink point to the next ink point; the projections "dx_s" and "dy_s" on the X and Y axes respectively of the distance between the current ink point and the first ink point in the stroke (shown in FIG. 5C); and the projections "dx_g" and "dy_g" on the X and Y axes respectively of the distance between the current ink point and the center of gravity of the stroke (shown in FIG. 5D).

In an embodiment, for each feature of the set of individual geometric features, the feature is determined over all ink points of the segment (where appropriate) to determine respective values for the ink points of the segment. Then, one or more statistical measures are calculated, for each feature, based on the determined respective values corresponding to the feature. In an embodiment, for each feature, the minimum value, the maximum value, and the median value are obtained based on the determined respective values corresponding to the feature.

In an embodiment, the one or more statistical measures, computed over all features of the set of individual geometric features, correspond to the statistical sub-stroke geometric features for the sub-stroke.

The global sub-stroke geometric features are features that represent the overall sub-stroke path (e.g., length, curvature, etc.). In an embodiment, generating the global sub-stroke geometric features for a sub-stroke comprises computing one or more of: a sub-stroke length, a count of singular ink points (such as inflection points and/or crossing points (a crossing point being a point where the stroke intersects itself)) within the sub-stroke, and a ratio between the sub-stroke length and a distance between its first and last ink points.

In an embodiment, the geometric features associated with a segment or sub-stroke includes both statistical sub-stroke geometric features and global sub-stroke geometric features determined based on the sub-stroke.

Figures 6, 7:
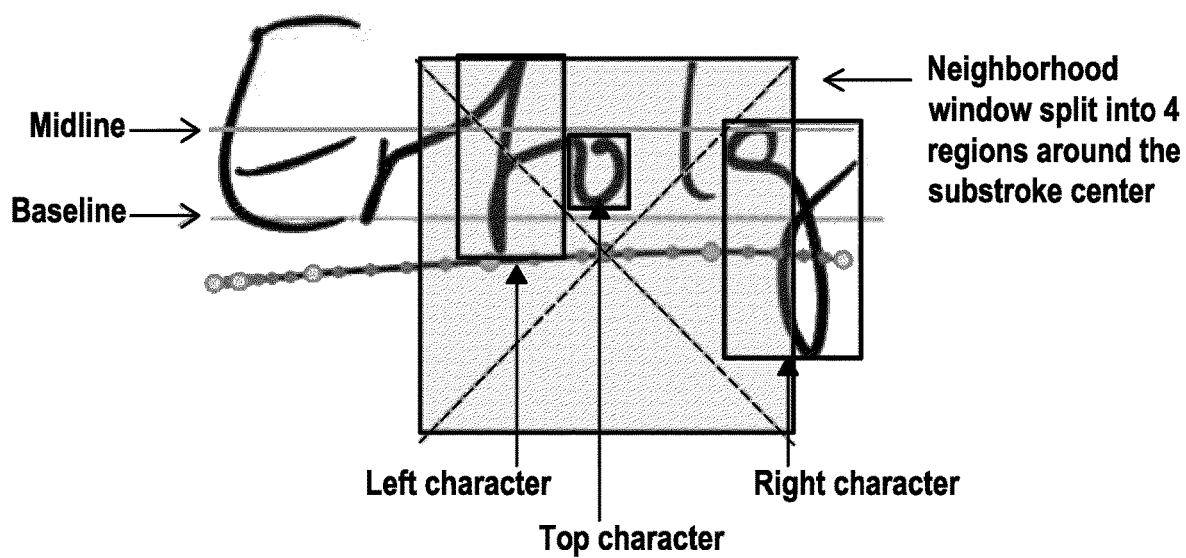
FIG. 6 illustrates example gesture strokes according to an embodiment of the present invention.
FIG. 7 illustrates an example approach for generating textual neighborhood features for a sub-stroke according to an embodiment of the present invention.

As mentioned above, the neighborhood features associated with a segment or sub-stroke represent spatial relationships between the sub-stroke and content that neighbors the sub-stroke. This information is useful to eliminate ambiguity between different gesture strokes. For example, as shown in FIG. 6, a Strike-through gesture stroke and an Underline gesture stroke can have similar shapes and as such similar geometric features. However, when the position of the stroke relative to its neighboring content is considered (i.e., whether or not the stroke is below the baseline of the characters or words), distinction between the two gesture strokes become much easier.

In an embodiment, generating the neighborhood features comprises generating one or more of:
  textual neighborhood features representing spatial relationships between the sub-stroke and textual content that neighbor the sub-stroke;
  mathematical neighborhood features representing spatial relationships between the sub-stroke and mathematical content that neighbor the sub-stroke; and
  non-textual neighborhood features representing spatial relationships between the sub-stroke and non-textual content that neighbor the sub-stroke.

As mentioned above, in an embodiment, the content that neighbors the sub-stroke is is content that intersects a window centered with respect to the sub-stroke. The window size may be configured in various ways. In one embodiment, the window size is set proportionally to the mean height of characters and/or symbols in the electronic document. In another embodiment, if the electronic document contains no characters or symbols, the window size is set proportionally to the size of the touch-based user interface (which may correspond to the screen size of the device).

In an embodiment, the three types of neighborhood features (textual, mathematical, and non-textual) are independent of one another. Each type may have its own fixed number of features.

FIG. 7 illustrates an example approach for generating textual neighborhood features for a sub-stroke according to an embodiment of the present invention. As shown in FIG. 7, the approach includes selecting a neighborhood window centered at the sub-stroke and then dividing the neighborhood window into four regions around the sub-stroke center. The four regions may be determined by the intersecting diagonals of the neighborhood window.

Next, the four closest characters and/or the four closest words located at the left, right, top, and bottom of the sub-stroke (which are at least partly contained within the selected window) are identified. For example, a text recognizer, as described in U.S. Pat. No. 9,875,254 B2, may be used to identify the closest characters and/or words. In the example of FIG. 7, the selected neighborhood window contains characters only and as such only characters are identified. Specifically, a left character, a top character, and a right character are identified.

Next, for each identified character or word, a group of features are determined. In an embodiment, the group of features include the distance between the center of the sub-stroke and a center of the identified character or word (the center of the identified character or word being the center of a bounding box of the identified character or word); the projections on the X and Y axes respectively of said distance; the distance between the center of the sub-stroke and a baseline of the identified characters or words; and the distance between the center of the sub-stroke and a midline of the identified characters or words. The baseline is the imaginary line upon which a line of text rests. The midline is the imaginary line at which all non-ascending letters stop. In an embodiment, the baseline and the midline are determined and provided by a text recognizer to the gesture recognizer.

In an embodiment, if no character or word is identified in a given region (e.g., no bottom character or word in the example of FIG. 7), default values are used for the textual neighborhood features corresponding to the region.

As would be understood by a person of skill in the art based on the teachings herein, the neighborhood window is not limited to a square window as shown in FIG. 7 and may be rectangular. Further, the neighborhood window may be divided into more or fewer than four regions in other embodiments. As such, more or fewer than four closest characters and/or four closest words may be identified.

Mathematical neighborhood features and non-textual neighborhood features for a sub-stroke may also be generated according to the above-described approach, with mathematical or non-textual content identified instead of textual content.

In an embodiment, for mathematical neighborhood features, the closest mathematical symbols to the sub-stroke (e.g., four closest at the left, right, top, and bottom of the sub-stroke) are identified. For example, a math symbol recognizer, as described in WO 2017/008896 A1, may be used to identify the closest mathematical symbols. The features determined per identified symbol may include the projections on the X and Y axes of the distance between the center of the sub-stroke and the center of the symbol. As above, when a region does not include a mathematical symbol, the corresponding features are set to default values.

In an embodiment, for the non-textual neighborhood features, the closest shapes and primitives (parts of shapes) to the sub-stroke (e.g., four closest at the left, right, top, and bottom of the sub-stroke) are identified. For example, a shape recognizer, as described in WO 2017/067652 A1 or WO 2017/067653 A1, may be used to identify the closest shapes and primitives. The features determined per identified shape or primitive may include the distance between the center of the sub-stroke and the center of the shape or primitive. As above, when a region does not include a shape or primitive, the corresponding features are set to default values.

In an embodiment, the feature vector associated with a segment or sub-stroke includes both geometric features and neighborhood features as described above. As such, the feature vector describes both the shape of the sub-stroke and the content in which the sub-stroke is drawn. These two types of information are complementary and allow for a highly accurate recognition of the stroke as a gesture stroke or a non-gesture stroke.

At the end of step 106, the entire stroke is represented by a plurality of successive feature vectors (each vector corresponding to a respective sub-stroke of the stroke).

Returning to FIG. 1, in step 108, process 100 includes applying the plurality of feature vectors as an input sequence representing the stroke to a trained stroke classifier to generate a vector of probabilities, which include a probability that the stroke is a non-gesture stroke and a probability that the stroke is a given gesture stroke of a set of gesture strokes. As mentioned above, the set of gesture strokes includes pre-defined gesture strokes such as Scratch-out, Strike-through, Split, Join, Surround, and Underline. In an embodiment, step 108 may include determining the respective probabilities that the stroke is a gesture stroke for all gesture strokes of the set of gesture strokes (e.g., the probability that the stroke is a Scratch-out gesture stroke, the probability that the stroke is a Strike-through gesture stroke, etc.).

Figure 8:
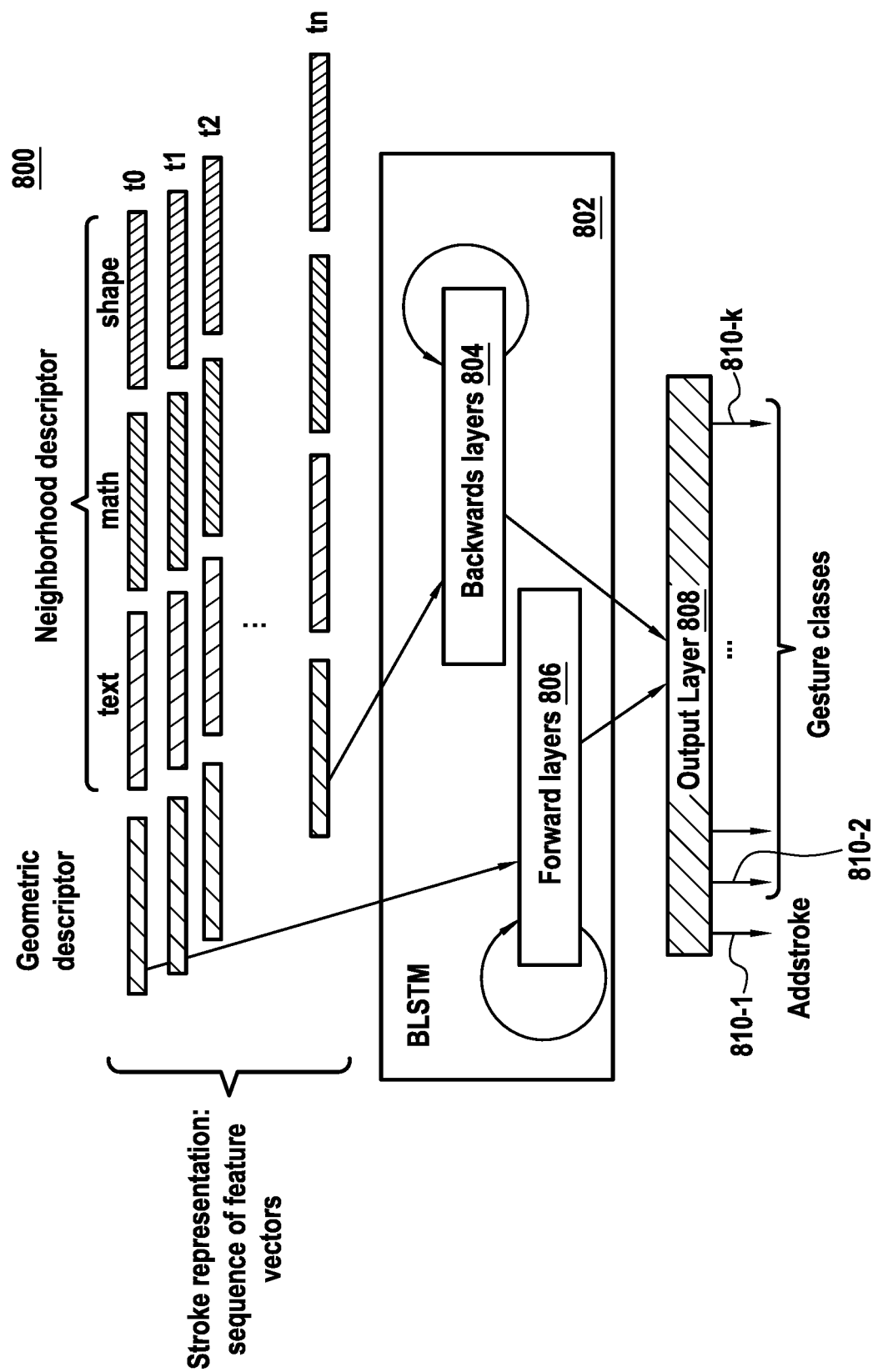
FIG. 8 illustrates an example stroke classifier according to an embodiment of the present invention.

FIG. 8 illustrates an example stroke classifier 800 according to an embodiment of the present invention. As mentioned above, the stroke classifier is trained before use for inference. An example approach which can be used to train the stroke classifier is described further below.

As shown in FIG. 8, example stroke classifier 800 includes a recurrent Bidirectional Long Short-Term Memory (BLSTM) neural network 802. Neural network 802 includes backward layers 804 and forward layers 806. Detailed description of the functions that may be used for backward layers 804 and forward layers 806 can be found in "Graves, A., & Schmidhuber, J. (2005), Framewise phoneme classification with bidirectional LSTM and other neural network architectures, Neural networks, 18(5-6), 602-610"; "S. Hochreiter and J. Schmidhuber, Long Short-Term Memory, NC, 9(8):1735-1780, 1997," and "F. Gers, N. Schraudolph, and J. Schmidhuber, Learning precise timing with LSTM recurrent networks, Journal of Machine Learning Research, 3:115-143, 2002." Implementation of backward layers 804 and forward layers 806 are within the skill and knowledge of a person skilled in the art and will not be described herein.

The use of a recurrent BLSTM neural network means that network includes memory blocks which enable it to learn long-term dependencies and to remember information over time. In the context of gesture recognition, this network permits the stroke classifier to handle a sequence of vectors (an entire stroke) and to account for the temporal dependencies between successive sub-strokes (i.e., to remember the details of the path of the stroke).

In addition, example stroke classifier 800 includes an output layer 808 configured to generate a set of probabilities 810-1, 810-2, ..., 810-$k$ based on the outputs of backward layers 804 and forward layers 806. In an embodiment, output layer 808 may be implemented using a cross-entropy objective function and a softmax activation function, which is a standard implementation for 1 of K classification tasks. A detailed description of such an implementation can be found for example in C. Bishop. Neural Networks for Pattern Recognition. Oxford University Press, Inc., 1995.

In operation, a sequence including a plurality of feature vectors $t_0, \ldots, t_n$ representing a stroke is applied as an input sequence to neural network 802. As shown in FIG. 8, and also described above, each feature vector $t_i$ (representing a sub-stroke) includes a geometric descriptor (corresponding to the geometric features described above) and a neighborhood descriptor (corresponding to the neighborhood features, including the textual, mathematical, and non-textual neighborhood features described above).

The input sequence is fed into neural network 802 both forwards and backwards by virtue of the bi-directionality of network 802. In an embodiment, the input sequence is fed in its original order (i.e., $t_0$ then $t_1$ then $t_2$, etc.) to forward layers 806, and in the reverse order (i.e., $t_n$ then $t_{n-1}$ then $t_{n-2}$, etc.) to backwards layer 804. This permits the network 802 to process the stroke data both by considering previous information (information relating to past sub-strokes) and by considering following information (information relating to next sub-strokes).

Output layer 808 receives the outputs of backward layers 804 and forward layers 806 and generates the set of probabilities 810-1, 810-2, ..., 810-$k$. In an embodiment, output layer 808 sums up the activation levels from both layers 804 and 806 to obtain the activation levels of nodes of output layer 808. The activation levels of the nodes of output layer 808 are then normalized to add up to 1. As such, they provide a vector with the set of probabilities 810-1, 810-2, ..., 810-$k$. In an embodiment, as shown in FIG. 8, probability 801-1 corresponds to the probability that the stroke is an add-stroke or a non-gesture stroke. Probabilities 810-2, ..., 810-$k$ each corresponds to a respective probability that the stroke is a respective gesture stroke of the set of gesture strokes.

In an embodiment, the gesture is recognized as being a particular gesture stroke (e.g., Underline) if the probability associated with the particular gesture stroke represents the maximum probability among the set of probabilities 810-1, 810-2, ..., 810-$k$. Otherwise, if the probability associated with a non-gesture stroke is the maximum, the stroke will be considered a non-gesture stroke or an add-stroke.

In an embodiment, the stroke classifier is trained based on a set of training data specifically tailored for the stroke recognition task. As the stroke classifier is intended to distinguish between gesture strokes and non-gesture strokes, in an embodiment, the training data includes both gesture strokes (e.g., Underlines, Strike-throughs, etc.) and non-gesture strokes (e.g., text, math symbols, non-text strokes).

Figure 9C:
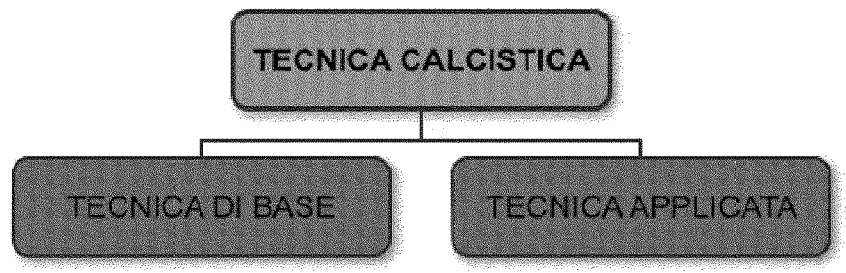
Figure 9D:
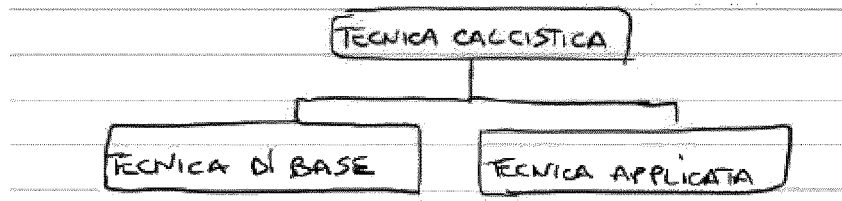

In an embodiment, the training data is built by imitating real use cases. Specifically, using a dedicated protocol for data collection, users are asked to copy notes (the original notes can be handwritten or typeset) to generate handwritten electronic notes. An example original note and a handwritten electronic copy thereof created by a user are shown in FIGS. 9A and 9B respectively. Then, the user is shown another version of the original note with additional strokes applied (the additional strokes may be applied to different types of content in the note) and is asked to reproduce this version. For example, FIG. 9C illustrates another version of the original note of FIG. 9A with some content highlighted. In FIG. 9D, the user reproduces this version by double-underlining the highlighted content. The stroke data is captured as the user reproduces the modified content to be used in training.

Using the above approach, notes with various layouts (simple, multi-column, with/without separators, with or without title, etc.) and with various content types (text, tables, diagrams, equations, geometry, etc.) may be generated. Additionally, various languages and scripts may be used. For example, users of different countries may be invited to copy notes in their native languages and to perform strokes on these notes.

Additionally, different touch-based devices (e.g., iPad, Surface, etc.) may be used to generate the notes. This allows the classifier to be trained on data generated using different ink capture characteristics (e.g., different sampling rates, different timestamp generation methods, different pressure levels applied, etc.), which renders the classification more device independent.

Figures 10, 11:
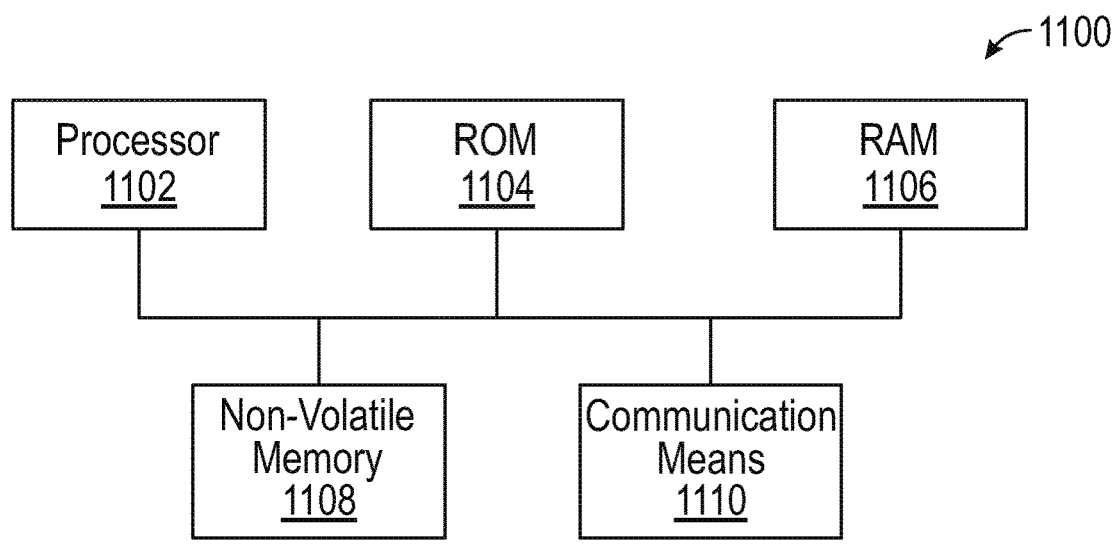
FIG. 10 illustrates an example handwritten note and a corresponding typeset version according to an embodiment of the present invention.
FIG. 11 illustrates an example computer device which may be used to implement embodiments of the present invention.

The training data may also include notes generated in order to train the stroke classifier to perform on typeset documents. In an embodiment, these notes are generated by converting the produced handwritten notes into typeset versions by replacing each ink element (character, symbol, shape, or primitive) in the handwritten note with a respective model that corresponds to the path of the ink element. In an embodiment, for each ink element, its corresponding typeset model is rescaled to fit into a bounding box of the original ink element, and then positioned with respect to the baseline and the center of the corresponding ink element. FIG. 10 illustrates an example handwritten note and a corresponding typeset version generated according to this approach.

The stroke data captured for the handwritten notes is then applied onto the respective typeset versions.

FIG. 11 illustrates a computer device 1100 which may be used to implement embodiments of the present invention. As shown in FIG. 11, computer device 1100 includes a processor 1102, a read-only memory (ROM) 1104, a random access memory (RAM) 1106, a non-volatile memory 1108, and communication means 1110. The ROM 1104 of the computer device 1100 may store a computer program including instructions that when executed by processor 1102 cause processor 1102 to perform a method of the present invention. The method may include one or more of the steps described above in FIG. 1.

ADDITIONAL VARIANTS

Although the present invention has been described above with reference to certain specific embodiments, it will be understood that the invention is not limited by the particularities of the specific embodiments. Numerous variations, modifications and developments may be made in the above-described embodiments within the scope of the appended claims.

The invention claimed is:

1. A method for recognizing gesture strokes in user input applied onto an electronic document via a touch-based user interface, wherein the electronic document includes handwritten content or typeset content comprising:

receiving training data to a stroke classifier, wherein the training data comprises a plurality of notes corresponding to a path of an ink element, wherein the plurality of notes comprise a plurality of different sampling rates and a plurality of different applied pressure levels;

receiving user input data, representing a stroke and comprising a plurality of ink points in a rectangular coordinate space and a plurality of timestamps associated respectively with the plurality of ink points;

segmenting the plurality of ink points into a plurality of segments each corresponding to a respective sub-stroke of the stroke and comprising a respective subset of the plurality of ink points;

generating a plurality of feature vectors based respectively on the plurality of segments;

providing a device-independent attribute to the stroke classifier by training the stroke classifier via a neural network based on the training data using the plurality of different sampling rates and the plurality of different applied pressure levels; and applying the plurality of feature vectors as an input sequence representing the stroke to the stroke classifier to generate a vector of probabilities including a probability that the stroke is a non-gesture stroke and a probability that the stroke is a given gesture stroke of a set of gesture strokes, wherein the non-gesture stroke corresponds to content being added by the user, whereas the given gesture stroke of the set of gesture strokes comprises a pre-defined action on the content of the electronic document.

2. The method of claim 1, comprising:
generating a plurality of corrected timestamps based on the plurality of timestamps.

3. The method of claim 2, wherein generating the plurality of corrected timestamps based on the plurality of timestamps comprises:
determining a function that approximates an original timestamp curve of the plurality of ink points; and
modifying a timestamp of the plurality of timestamps to a value obtained according to the determined function.

4. The method of claim 1, comprising: resampling the plurality of ink points to generate a second plurality of ink points and an associated second plurality of timestamps, the second plurality of timestamps characterized by a fixed duration between consecutive timestamps.

5. The method of claim 4, wherein said resampling comprises interpolating the plurality of ink points and associated plurality of timestamps to generate the second plurality of ink points and the associated second plurality of timestamps.

6. The method of claim 1, wherein said segmenting comprises segmenting the plurality of ink points such that the plurality of segments have equal duration.

7. The method of claim 6, wherein the plurality of segments have an equal number of ink points.

8. The method of claim 1, wherein generating the plurality of feature vectors based respectively on the plurality of segments comprises, for each segment of the plurality of segments corresponding to a respective sub-stroke:
generating geometric features that represent the shape of the respective sub-stroke; and generating neighborhood features that represent spatial relationships between the sub-stroke and content that neighbors the sub-stroke, wherein the content that neighbors the sub-stroke intersects a window centered with respect to the sub-stroke.

9. The method of claim 8, wherein generating the geometric features comprises generating statistical sub-stroke geometric features and global sub-stroke geometric features for the sub-stroke.

10. The method of claim 9, wherein generating the statistical sub-stroke geometric features comprises, for each geometric feature of a set of geometric features:

determining respective values for the ink points of the segment corresponding to the respective sub-stroke; and
calculating one or more statistical measures based on the determined respective values.

11. The method of claim 9, wherein generating the global sub-stroke geometric features for the sub-stroke comprises computing one or more of: a sub-stroke length, a count of singular ink points within the sub-stroke, and a ratio between the sub-stroke length and a distance between a first and a last ink point of the sub-stroke.

12. The method of claim 8, wherein generating the neighborhood features comprises generating one or more of:
textual neighborhood features representing spatial relationships between the sub-stroke and textual content that neighbors the sub-stroke;
mathematical neighborhood features representing spatial relationships between the sub-stroke and mathematical content that neighbors the sub-stroke; and
non-textual neighborhood features representing spatial relationships between the sub-stroke and non-textual content that neighbors the sub-stroke.

13. A computing device, comprising:
a processor; and
memory storing instructions that, when executed by the processor, configure the processor to perform a method according to claim 1.

14. A non-transitory computer readable medium having a computer readable program code embodied therein, said computer readable program code adapted to be executed to implement a method for recognizing gesture strokes in user input applied onto an electronic document via a touch-based user interface, wherein the electronic document includes handwritten content or typeset content comprising, a computing device comprising a processor and at least one system non-transitory computer readable medium for recognizing the input under control of the processor, the method comprising:
receiving training data to a stroke classifier, wherein the training data comprises a plurality of notes corresponding to a path of an ink element, wherein the plurality of notes comprise a plurality of different sampling rates and a plurality of different applied pressure levels;
receiving user input data, representing a stroke and comprising a plurality of ink points in a rectangular coordinate space and a plurality of timestamps associated respectively with the plurality of ink points;
segmenting the plurality of ink points into a plurality of segments each corresponding to a respective sub-stroke of the stroke and comprising a respective subset of the plurality of ink points;
generating a plurality of feature vectors based respectively on the plurality of segments;
training the stroke classifier via a neural network based on the training data;
providing a device-independent attribute to the stroke classifier by training the stroke classifier via a neural network based on the training data using the plurality of different sampling rates and the plurality of different applied pressure levels; and
applying the plurality of feature vectors as an input sequence representing the stroke to the stroke classifier to generate a vector of probabilities including a probability that the stroke is a non-gesture stroke and a probability that the stroke is a given gesture stroke of a set of gesture strokes, wherein the non-gesture stroke corresponds to content being added by the user, whereas the given gesture stroke of the set of gesture strokes comprises a pre-defined action on the content of the electronic document.

* * * * *